March 10, 1942. E. V. SCHNEIDER 2,275,995
COIL WINDING MACHINE
Filed Oct. 11, 1941 3 Sheets-Sheet 2

Inventor.
Emmor V. Schneider
By Frease and Bishop
Attorneys

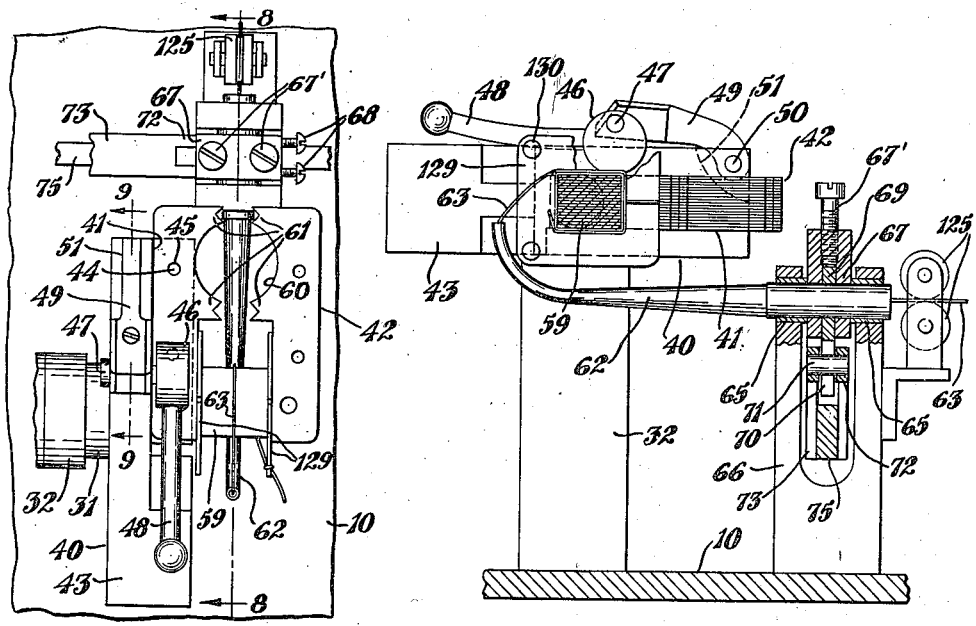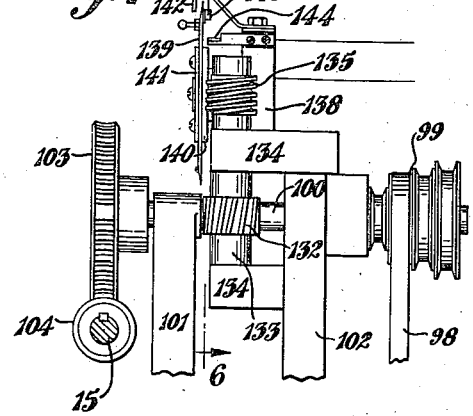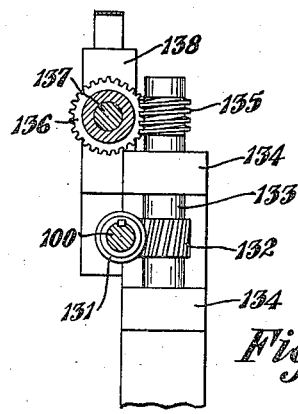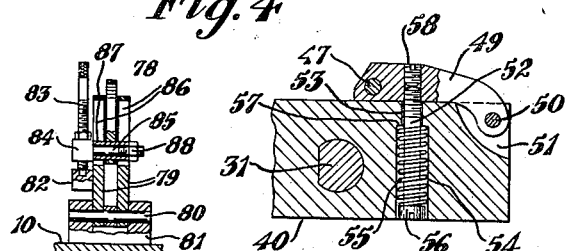

Patented Mar. 10, 1942

2,275,995

UNITED STATES PATENT OFFICE 2,275,995

COIL WINDING MACHINE

Emmor V. Schneider, Alliance, Ohio, assignor to The Alliance Manufacturing Company, Alliance, Ohio, a corporation of Ohio Application October 11, 1941, Serial No. 414,696

12 Claims. (Cl. 242—1)

The invention relates to apparatus for winding coils and more particularly to a machine especially designed to wind the coil upon a shaded pole type motor of the character disclosed in my prior application Serial No. 336,168, filed May 20, 1940, now Patent No. 2,261,890.

The motor referred to has an elongated stator or laminated core of substantially U-shape, the coil being wound upon the closed end of the stator.

Due to the peculiar construction of this motor, the pole portions of the core extend toward each other at the open end of the core leaving only a restricted opening through which the wire may be passed for winding the coil, thus, making this a very difficult operation.

The object of the invention is to provide a coil winding machine for winding the coil upon a motor of the type above referred to, means being provided for winding the coil entirely across the closed end of the core.

Another object is to provide a machine of this character having a curved tubular finger through which the wire is fed and means for rotating the core of the motor and oscillating the finger so as to feed the wire to the closed end of the core and forming a coil entirely across the same.

Another object of the invention is to provide means for controlling the speed of oscillation of said tubular finger relative to the rotation of the core in order to compensate for wire of different gauges.

A further object is the provision of a machine of the character referred to with means for operating an alarm when the machine has made the desired number of revolutions.

A still further object is the provision of means for controlling the number of revolutions to be made by the machine for each operation.

Another object of the invention is the provision of a dual rotating head for winding coils upon two motors simultaneously whereby each head and the motor carried thereby balances the other.

A still further object is the provision of novel means for clamping a motor upon each head.

Figure 1:
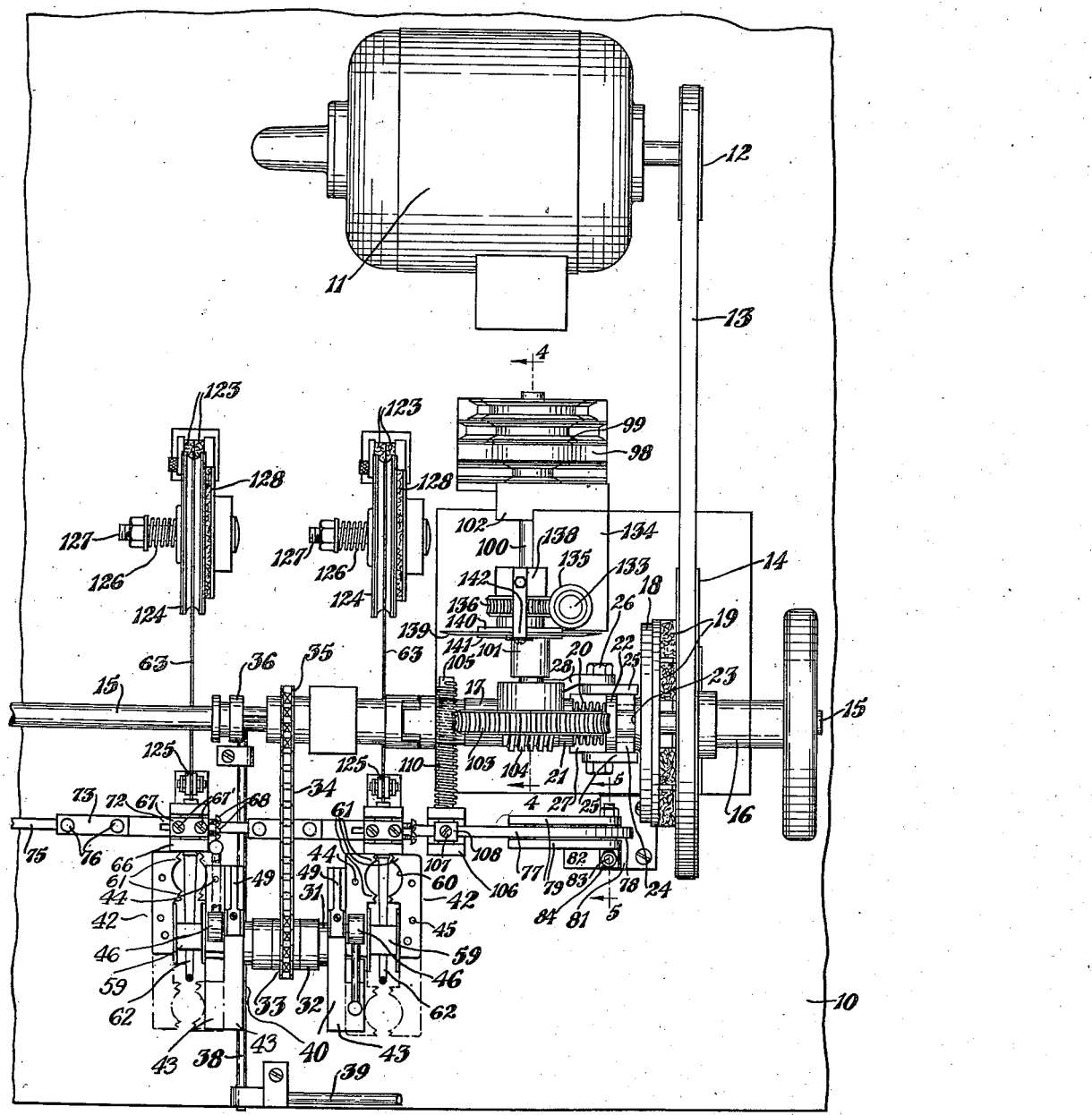
Figures 2, 3:
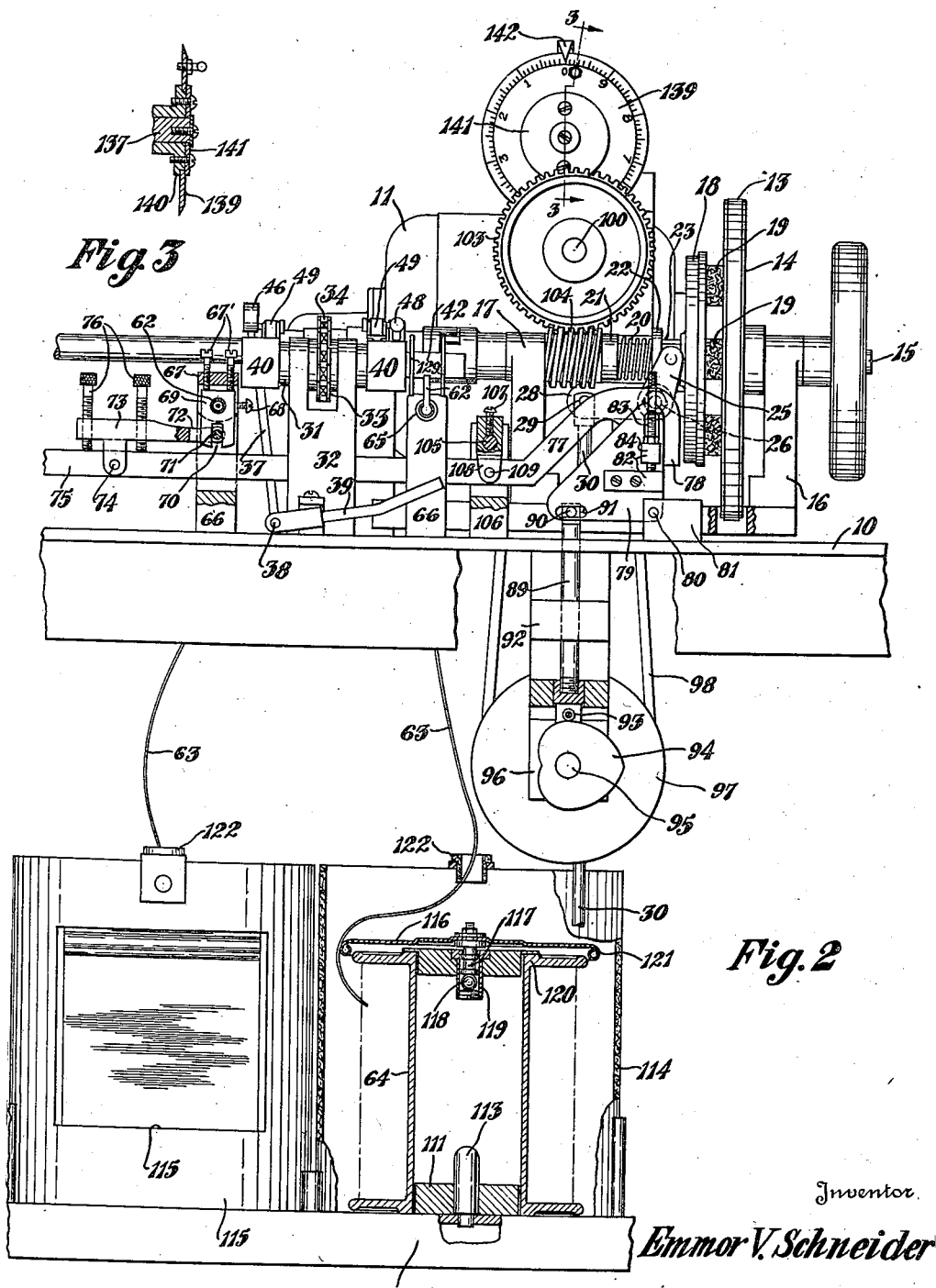

The above objects together with others which will be apparent from the drawings and following description or which may be later referred to may be attained by constructing the improved coil winding machine in the manner illustrated in the accompanying drawings in which Figure 1 is a plan view of one unit of the improved coil winding machine to which the invention pertains;

Fig. 2, a front elevation of the apparatus shown in Fig. 1 parts being broken away for the purpose of illustration;

Fig. 3, a transverse section through the dial for controlling the number of revolutions for an operation, taken as on the line 3—3, Fig. 2;

Fig. 4, a detail elevation of the control and alarm mechanism taken on the line 4—4, Fig. 1;

Fig. 5, a detail sectional view taken as on the line 5—5, Fig. 1;

Fig. 6, a sectional view taken on the line 6—6, Fig. 4;

Fig. 7, an enlarged plan view of the rotating head which carries the motor on which the coil is to be wound;

Fig. 8, a section on the line 8—8, Fig. 7; and

Fig. 9, a fragmentary detail section taken as on the line 9—9, Fig. 7.

Similar numerals refer to similar parts throughout the several views.

The machine may be mounted upon a bench or table 10 and in practice a battery of any desired number of units may be operated by a single driving means, but for the purpose of illustration only one unit is illustrated and described as each unit is identically the same in construction, operation and relation to the driving means.

A motor 11 or other suitable source of power may be provided for driving the machine and is shown as provided with a drive pulley 12 connected by the belt 13 to a pulley 14 rotatably mounted upon the shaft 15 journaled in suitable bearings 16 and 17 mounted upon the bench or table 10.

The pulley 14 is normally operatively connected to the shaft 15 by a friction clutch comprising the disk 18 which is splined upon the shaft 15 and normally held in frictional contact with the cork blocks 19 upon the pulley by means of the coil spring 20 interposed between the collar 21 upon the shaft and the hub 22 of the disk 18.

For the purpose of stopping the machine when an operation is completed the hub 22 of the disk 18 is circumferentially grooved as at 23 to receive a pair of shoes 24 carried upon the free ends of the arms 25 of a bell crank lever fulcrumed as at 26 upon the bearing block 27 the other arm 28 of the bell crank lever being pivotally connected as at 29 to the upper end of a link 30 which may be connected to a treadle or the like (not shown), whereby depression of the treadle will operate the link and bell crank to slidably move the disk 18 to the left as viewed in Fig. 1 and Fig. 2, disconnecting the pulley 14 from the shaft 15.

A short countershaft 31 is journalled in the forked bearing 32 mounted upon the table or bench 10 at a point in front of the shaft 15.

A sprocket wheel 33 is fixed upon the central portion of the shaft 31 and connected by the sprocket chain 34 with the sprocket wheel 35 rotatably mounted upon the shaft 15 and adapted to be operatively connected thereto as by the sliding clutch member 36 operated through the finger 37, rocker shaft 38 and handle 39 to operatively connect the sprocket wheel 35 to the shaft 15.

A rotating head indicated generally at 40 is fixed upon each end of the shaft 31. Each of these heads has one end portion cut-away as at 41 to receive a core of the motor indicated generally at 42, the other end 43 of the head acting as a counterweight to balance the motor core.

Pins 44 are provided on the cut-away portion of each head to be received in apertures 45 in the core 42 in order to properly position the same upon the head.

An eccentric clamp 46 is pivoted as at 47 and provided with a handle 48 for operating the same to clamp the core tightly upon the head as best shown in Fig. 8.

This eccentric is preferably pivotally mounted upon the lever arm 49 pivoted as at 50 within a recess 51 in the head.

A screw 52 is mounted in the lever 49 and slidably located within a bore 53 in the head, said bore having the enlarged lower end portion 54 within which a coil spring 55 is located being interposed between the head 56 of the screw and the shoulder 57 at the upper end of the enlargement.

A set screw 58 may be provided for locking the screw 52 in adjusted position.

The particular motor for which the machine was designed is disclosed in detail in my prior application Serial No. 336,168, above referred to and is a two pole shaded pole type motor, the stator or core 42 of which is of elongated U-shape, the coil being wound upon the closed end 59 of the core.

The opposite end of the core is provided with the substantially circular opening 60 to receive the rotor of the motor, the opposite pole pieces 61 being located at each side of said opening and extending toward the longitudinal center of the stator, thus, considerably restricting the opening through which the wire may be passed for winding the coil upon the portion 59, making this a very difficult operation.

The present machine was designed in order to overcome this difficulty and for this purpose includes an oscillating curved tubular finger 62 through which the wire 63 is fed from the spool 64 to the closed end 59 of the stator and coiled around the same as the stator is rotated upon the head.

This tubular finger is mounted to oscillate in bushings 65 in the U-shaped bearing block 66, mounted upon the table or bench 10.

The base end of the finger 62 is fixed in the yoke 67 by the set screws 68.

A lever 69 is located within the yoke 67 and loosely mounted around the base of the finger 62. The lower end of the lever 69 is forked as at 70 and receives the stud 71 upon the forked end 72 of the lever 73.

The yoke 67 and finger 62 may be adjusted relative to the lever 69 by means of the set screws 67' located through the top of the yoke and bearing upon the upper end of the lever 69 at opposite sides of the longitudinal center thereof.

The lever 73 is fulcrumed as at 74 upon the reciprocating bar 75 and arranged to be adjusted thereon as by the set screws 76 located on opposite sides of the fulcrum and bearing against the top of the reciprocating bar 75.

The right hand end of the reciprocating bar 75, as viewed in Figs. 1 and 2, may be bent upwardly at 77 and then downward as at 78 between a pair of triangular bell crank levers 79 fulcrumed at 80 upon a block 81 mounted upon the table 10.

A block 82 is fixed upon the outer side of one of the bell crank levers 79 and an adjusting screw 83 is mounted therein and located through the nut 84, carrying bolt 85 located through the vertical slots 86 in the bell crank levers 79 and through the depending end 78 of the reciprocating bar 75, a bushing 87 preferably surrounding the bolt and being retained thereon as by the nut 88.

A push rod 89 has a pin 90 at its upper end located in the slots 91 of the bell crank levers 79, said push rod being slidably located through a guide 92 and having a roller 93 upon its lower end engaging the periphery of the cam 94 which is mounted upon the shaft 95 journaled in the bearing 96.

A pulley 97 is fixed upon the shaft 95 and operatively connected as by the belt 98 with a pulley 99 upon the shaft 100 journaled in bearings 101 and 102 mounted upon the table 10.

A worm gear 103 is fixed upon the shaft 100 and meshes with the worm screw 104 mounted upon the shaft 15.

For the purpose of holding the roller 93 of the push rod 89 upon the cam 94 a shaft 105 is journaled in a bearing 106, mounted upon the table, and fixed thereon, as by a set screw 107, a lever 108 pivotally connected as at 109 to the reciprocating bar 75.

A coil spring 110 is located around the shaft 105, one end thereof being connected to the shaft and the other end to the bearing block 106 so as to always maintain the rollers 93 of the push rod in contact with the cam 94.

The spool 64 containing the wire from which the coil is formed may be centered upon a disk 111 located upon the base 112 and connected thereto as by the center pin 113.

The spool may be enclosed within a cylindric casing 114 having a side opening 115 so that the operator may tell at a glance the amount of wire still remaining upon the spool.

A disk 116 is concentrically journalled upon the top of the spool by means of the central pivot stud 117 resting upon the ball 118 located in the cylindric socket 119 carried by the head 120 of the spool.

The wire 63 as it is unwound from the spool passes over the rounded periphery 121 of the disk 116 which is free to rotate as the wire unwinds from the spool.

The wire passes from the spool through the cylindric guide 122 in the top of the casing 114 then between the felt pads 123 over the pulley 124 and between the rollers 125 to the tubular oscillating finger 62.

A spring 126 upon the shaft 127 of each pulley 124 normally urges the opposite side of the pulley against the friction disk 128 to prevent the pulley from rotating too rapidly as the wire is drawn over the same.

In the operation of the machine to wind the coil of wire upon the stator of the motor a strip of varnished cambric or the like is wrapped around the closed end 59 of the stator between a pair of fibre sheets 129 which are placed upon the same.

The leading end of the wire 63 is tied through an aperture 130 in one of the fibre sheets and the machine is operated to rapidly rotate the heads 40 and with them the stators 42 which are clamped thereto.

At the same time the tubular finger 62 is slowly oscillated so as to feed the wire in uniform rows or layers upon the closed end 59 of the stator until a coil of the desired size is produced.

It will be seen that by providing the oscillating curved tubular finger which feeds the wire to the stator it is possible to form the coil entirely across the closed end 59 of the stator from one fibre sheet 129 to the other regardless of the restricted openings between the pole pieces 61 of the stator.

For the purpose of providing an alarm or signal to notify the operator when the desired number of turns have been made upon the coil, a device is provided which is shown in detail in Figs. 3, 4, and 6.

A spiral gear 131 upon the shaft 100 meshes with a spiral gear 132 upon the vertical shaft 133 journaled in the bearings 134.

A worm screw 135 is fixed upon the shaft 133 and meshes with a worm gear 136 upon a shaft 137 journaled in a bearing 138, a dial 139 is frictionally mounted upon the shaft 137 between the flange 140 and the flange plate 141 this dial being arranged to normally rotate with the shaft 137, but is capable of being manually rotated relative to the shaft.

A stationary pointer 142 is provided adjacent to the dial for indicating the number of rotations of the heads for forming a coil.

Any desired form of electric signal or alarm may be operated by the movable contact 143 upon the dial contacting the stationary contact 144.

It will be seen that the alarm may be set to operate at any predetermined time by manually rotating the dial 139 upon the shaft 137 to the desired position.

I claim:

1. Apparatus for winding coils upon motor stators comprising a rotatable head, means for detachably mounting a stator upon said head, a curved, tubular finger mounted for oscillation upon an axis at right angles to the axis upon which the head rotates, the free end of said finger terminating adjacent to the stator, means for feeding a wire through said finger to the stator, and means for simultaneously rotating the head and oscillating the finger to wind a coil of wire upon the stator.

2. Apparatus for winding coils upon motor stators comprising a rotatable head, means for detachably mounting a stator upon said head, a curved, tubular finger mounted for oscillation upon an axis at right angles to the axis upon which the head rotates, the free end of said finger terminating adjacent to the stator, means for feeding a wire through said finger to the stator, and means for simultaneously, rapidly, rotating the head and oscillating the finger at a relatively slow speed to wind a coil of wire upon the stator.

3. Apparatus for winding coils upon motor stators comprising a rotatable head, means for detachably mounting a stator upon said head, a curved, tubular finger mounted for oscillation upon an axis at right angles to the axis upon which the head rotates, the free end of said finger terminating adjacent to the stator, means for feeding a wire through said finger to the stator, means for simultaneously rotating the head and oscillating the finger to wind a coil of wire upon the stator, and means for regulating the throw of the finger.

4. Apparatus for winding coils upon motor stators comprising a rotatable head, means for detachably mounting a stator upon one end portion of said head, counterbalancing means upon the other end portion of the head, a curved, tubular finger mounted for oscillation upon an axis at right angles to the axis upon which the head rotates, the free end of said finger terminating adjacent to the stator, means for feeding a wire through said finger to the stator, and means for simultaneously rotating the head and oscillating the finger to wind a coil of wire upon the stator.

5. Apparatus for winding coils upon motor stators comprising a rotatable head, means for detachably mounting a stator upon said head, a curved, tubular finger mounted for oscillation upon an axis at right angles to the axis upon which the head rotates, the free end of said finger terminating adjacent to the stator, means for feeding a wire through said finger to the stator, means for simultaneously rotating the head and oscillating the finger to wind a coil of wire upon the stator, an alarm, and means for operating said alarm when the head has completed a predetermined number of rotations.

6. Apparatus for winding coils upon motor stators comprising a rotatable head, means for detachably mounting a stator upon said head, a curved, tubular finger mounted for oscillation upon an axis at right angles to the axis upon which the head rotates, the free end of said finger terminating adjacent to the stator, means for feeding a wire through said finger to the stator, means for simultaneously rotating the head and oscillating the finger to wind a coil of wire upon the stator, an alarm, means for operating said alarm when the head has completed a predetermined number of rotations, and means for controlling the number of rotations made by the head before the alarm operates.

7. Apparatus for winding coils upon motor stators comprising a rotatable head, means for detachably mounting a stator upon said head, a curved, tubular finger mounted for oscillation upon an axis at right angles to the axis upon which the head rotates, the free end of the finger terminating adjacent to the stator, means for feeding a wire through said finger, a lever fixed to the finger, a reciprocating bar pivotally attached to the lever, a cam operatively associated with the reciprocating bar, and drive means operatively connected to the rotating head and to the cam.

8. Apparatus for winding coils upon motor stators comprising a rotatable head, means for detachably mounting a stator upon said head, a curved, tubular finger mounted for oscillation upon an axis at right angles to the axis upon which the head rotates the free end of the finger terminating adjacent to the stator, a spool of wire, a rotatable disk upon the end of the spool, means for withdrawing wire from the spool over the periphery of said disk and feeding the wire through said finger, and means for simultaneously rotating the head and oscillating the finger to wind a coil of wire upon the stator.

9. Apparatus for winding coils upon motor stators comprising a bearing, a shaft journaled through the bearing, a head fixed upon the shaft at each side of the bearing, means for detachably mounting a stator upon each head, a pair of curved, tubular fingers mounted for oscillation upon axes at right angles to the axis of the shaft, the free ends of said fingers terminating adjacent to the stators, means for feeding a wire through each finger to the adjacent stator and means for simultaneously rotating the heads and oscillating the fingers to wind a coil of wire upon each stator.

10. Apparatus for winding coils upon motor stators comprising a rotatable head, a lever fulcrumed upon the head, spring means for urging the lever toward the head, an eccentric clamp pivoted upon the lever for clamping a stator upon the head, a curved, tubular finger mounted for oscillation upon an axis at right angles to the axis upon which the head rotates, the free end of the finger terminating adjacent to the stator, means for feeding a wire through the finger to the stator, and means for simultaneously rotating the head and oscillating the finger to wind a coil of wire upon the stator.

11. Apparatus for winding coils upon motor stators comprising a rotatable head, means for detachably mounting a stator upon said head, a curved, tubular finger mounted for oscillation upon an axis at right angles to the axis upon which the head rotates, the free end of said finger terminating adjacent to the stator, means for feeding a wire through said finger to the stator, and means for simultaneously rotating the head and oscillating the finger to wind a coil of wire upon the stator, a dial, means for rotating the dial, and alarm means actuated by the dial at a predetermined time.

12. Apparatus for winding coils upon motor stators comprising a rotatable head, means for detachably mounting a stator upon said head, a curved, tubular finger mounted for oscillation upon an axis at right angles to the axis upon which the head rotates, the free end of said finger terminating adjacent to the stator, means for feeding a wire through said finger to the stator, means for simultaneously rotating the head and oscillating the finger to wind a coil of wire upon the stator, a dial, means for rotating the dial, alarm means actuated by the dial at a predetermined time, and means for manually setting said dial to regulate the time at which the alarm operates.

EMMOR V. SCHNEIDER.